United States Patent
Nir et al.

(10) Patent No.: US 10,169,324 B2
(45) Date of Patent: Jan. 1, 2019

(54) UNIVERSAL LEXICAL ANALYZERS

(71) Applicant: HEWLETT PACKARD ENTERPRISE DEVELOPMENT LP, Houston, TX (US)

(72) Inventors: Edo Nir, Yehud (IL); Albert Ribakovsky, Yehud (IL); Oren Gavriel, Yehud (IL); Gabi Shalev, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/373,204

(22) Filed: Dec. 8, 2016

(65) Prior Publication Data
US 2018/0165273 A1     Jun. 14, 2018

(51) Int. Cl.
*G06F 17/27*     (2006.01)
(52) U.S. Cl.
CPC .................. *G06F 17/277* (2013.01)
(58) Field of Classification Search
CPC ................ G06F 17/277; G06F 8/41
USPC ............................ 704/9; 717/140
See application file for complete search history.

(56) References Cited

U.S. PATENT DOCUMENTS

| | | | |
|---|---|---|---|
| 6,721,697 B1* | 4/2004 | Duan | G06F 17/277 704/2 |
| 2006/0117307 A1 | 6/2006 | Averbuch et al. | |
| 2013/0055223 A1* | 2/2013 | Xu | G06F 8/427 717/143 |
| 2015/0127324 A1 | 5/2015 | Mitchell et al. | |
| 2016/0162466 A1 | 6/2016 | Munro et al. | |
| 2016/0259851 A1 | 9/2016 | Hopkins et al. | |
| 2017/0090915 A1* | 3/2017 | Shlosberg | G06F 8/71 |
| 2017/0286103 A1* | 10/2017 | Caritos, II | G06F 11/3604 |

FOREIGN PATENT DOCUMENTS

| | | |
|---|---|---|
| CN | 104281096 A | 1/2015 |
| EP | 0434865 A1 | 7/1991 |

OTHER PUBLICATIONS

Teodor Rus and Tom Halverson, "A Language Independent Scanner Generator," 1998, pp. 1-37, The University of Iowa, USA, Available at: <homepage.cs.uiowa.edu/~rus/Courses/Compiler/scan1.pdf>.

* cited by examiner

*Primary Examiner* — Shawn Roberts

(57) ABSTRACT

An example lexical analysis system may include lexical analyzer instructions and training instructions. The lexical analyzer instructions, when executed, may form a universal lexical analyzer that is to lexically analyze an input program by evaluating a function that maps an input tuple of lexemes to an output tuple of tokens based on input probability parameters. The universal lexical analyzer may be configurable for any programming language by inputting a set of probability parameters for the respective programming language as the input probability parameters of the function. The training instructions, when executed, may generate a set of probability parameters for any programming language by: receiving training programs that are in the respective programming language, each comprising a tuple of lexemes with associated tokens, and determining the set of probability parameters for the respective programming language based on lexemes and tokens in the training programs that are in the respective programming language.

17 Claims, 7 Drawing Sheets

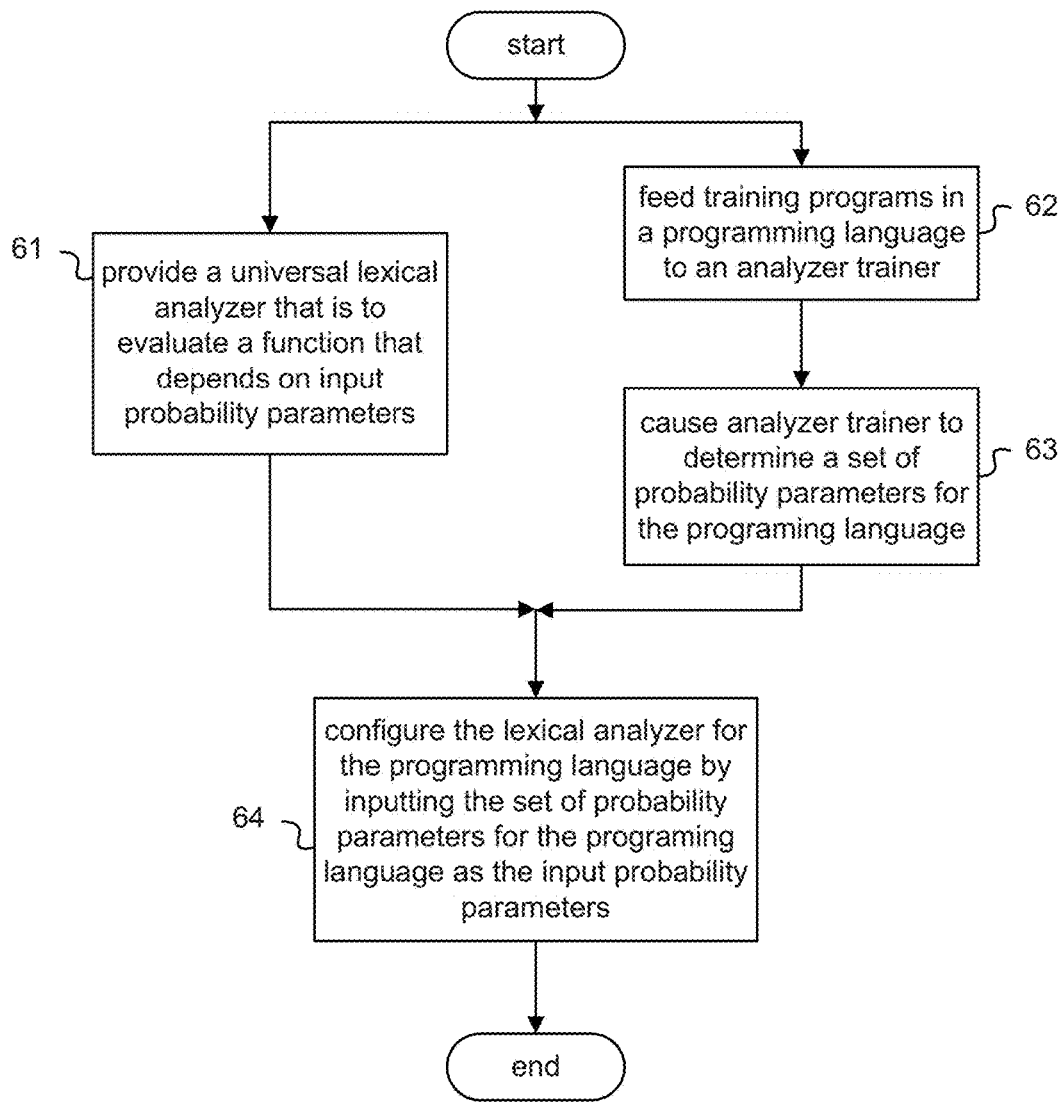

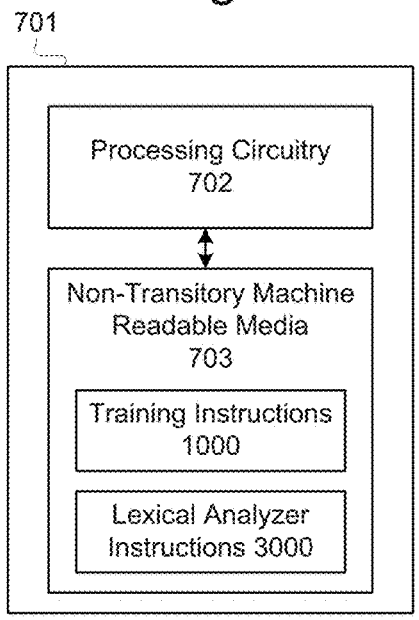
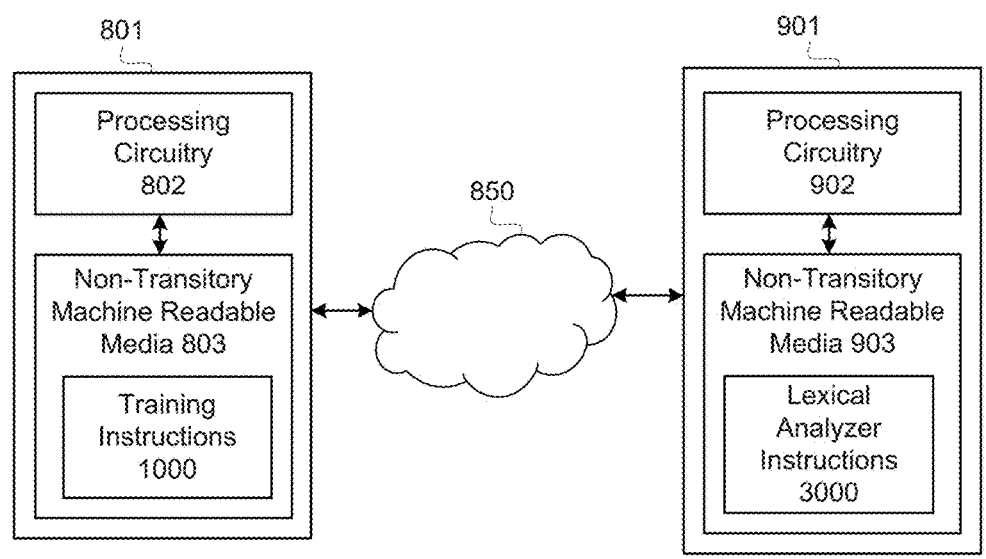

UNIVERSAL LEXICAL ANALYZERS

BACKGROUND

A lexical analyzer may analyze input computer programs by assigning a token to each of the lexemes in the ordered string of text that constitutes the computer program. A lexeme is a distinct group of consecutive characters (e.g., "func", "=", "325", ";", etc.), while a token is an identification of a type, category, or classification of a lexeme (e.g., "variable", "integer", "assignment", "comma", etc.).

Such a lexical analyzer may be included, together with a syntax analyzer, as part of a parser. The lexical analyzer may generate a stream of tokens and/or token-lexeme pairs, while a syntax analyzer may check the output of the lexical analyzer for syntax errors. A parser is often used as part of a compiler. A parser may also be used as a syntax checker, for example in a code editor or integrated development environment (IDE), by analyzing a program and notifying a programmer if there are any syntax errors.

BRIEF DESCRIPTION OF THE DRAWINGS

FIG. 6 illustrates another example method of configuring an instance of a universal lexical analyzer.

FIG. 7 illustrates an example computing device.

FIG. 8 illustrates example computing devices.

DEFINITIONS

Figure 1:
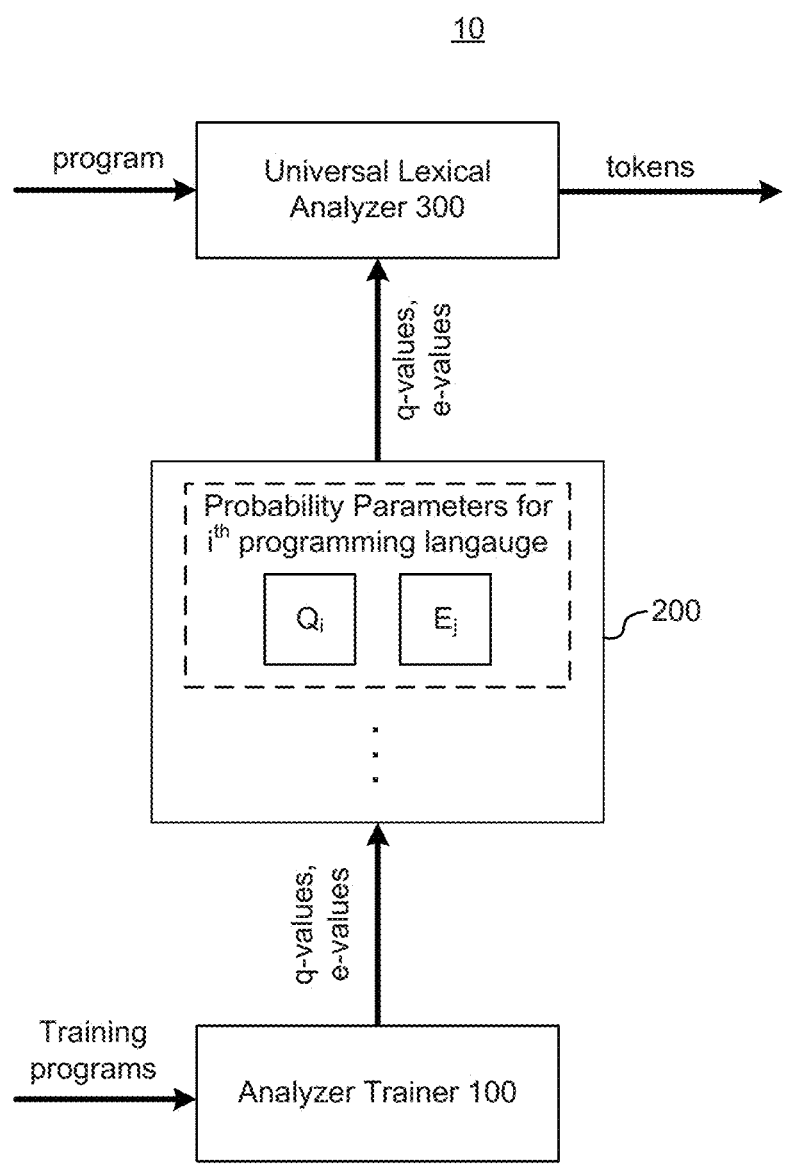
FIG. 1 illustrates an example lexical analysis system that includes an example analyzer trainer, example storage media, and an example universal lexical analyzer.

As used herein, a "computer program" or a "program" is any segment of programing source code (i.e., code written in human-readable form) that, when executed (possibly after having been compiled or interpreted), causes some operation or series of operations to be performed. Each program comprises a group of lexemes that are arranged in a specific order, which is to say each program comprises a tuple of lexemes. The size of the program is not relevant—for example, both a single line of code and thousands of pages of code could be programs.

As used herein, a "lexeme" is a group of consecutive characters in a computer program that is distinct from other groups of characters according to a set of rules that determine boundaries between lexemes. Any set of rules may be used to determine boundaries between lexemes. For example, whitespace may be a boundary between lexemes, i.e., two groups of consecutive characters that are separated by whitespace may be distinct lexemes. As another example, when two different types of characters (e.g., a letter and a ".") are adjacent, this may be a boundary between lexemes; in other words, a group of consecutive characters of one type and an adjacent group of characters of a different type may be distinct lexemes, even if the groups are not separated by whitespace. As another example, certain symbols may always be considered as distinct lexemes regardless of which other characters are adjacent to them. For example, the program "void func(int x) {console.write(x);}" may include the following lexemes: "void" "func" "(" "int" "x" ")" "{" "console" "." "write" "(" "x" ")" ";" "}". In the art, a lexeme may occasionally be referred to as the "value" of a "token".

As used herein, a "token" is a character or group of characters that identifies a category or classification of a lexeme of a computer program. Examples of classifications for lexemes of computer programs include identifiers, variables, integers, assignment operators, commas, etc. Examples of possible tokens for such classifications could include, for example, "ID", "var", "int", "assign", ",", etc. For certain classifications, there may be exactly one lexeme that falls under the classification—for example, the lexeme ";" may be classified as a semicolon, and may be the only member of this classification. For other classifications, there may be many (perhaps infinitely many) lexemes that would fall under the classification—for example, integers (a classification) may include the lexemes "1", "235", "53438", etc. There may be many possible ways that a classification could be identified—for example, the classification of semicolons could be identified, for example, by the token ";", by the token "semi", by the token "semicolon", etc. In certain examples, the token for a classification may use the same character(s) as a lexeme that is a member of the classification (this is often the case for classifications which have only one lexeme instance); for example, the character ";" may be used both as the token of the classification of semicolons and as the sole lexeme in that classification. A lexical analyzer may use any convention for determining which specific tokens should identify each classification.

It should be noted that various different meanings of "token" have been used in the art that may differ slightly from the meaning of "token" defined in the preceding paragraph. For example, "token" has been used by some to refer collectively to a value-kind pair, and in this approach "value" is used to refer to what is termed herein a lexeme and "kind" is used to refer to what is termed herein a token. For example, under such usages a pair such as "<x, identifier>" would be called a "token", where "x" is the "value" of the token and "identifier" is the "kind" of the token; in contrast, herein a pair such as "<x, identifier>" would be referred to as a lexeme-token pair, with "x" being the lexeme and "identifier" being the token. While these other senses of "token" may be useful and valid in certain contexts, to avoid confusion all uses of "token" herein should be understood to have the meaning defined in the preceding paragraph.

As used herein, a "tuple" means an ordered list of elements. For ease of description, a tuple may be denoted herein by parenthesis containing a list of elements that are separated by commons, such as (a, b, c). It should be understood that the above-described notation is merely used for convenience, and does not imply any limitation as to the form in which a tuple may be represented in example systems described herein. For example, a tuple could be represented as a stream of elements separated by whitespace, as an array of elements, etc. Unlike a set, the order of elements in a tuple matters—thus, for example the tuple (a, b, c) is different from the tuple (c, b, a). In addition, unlike a set, in a tuple repetition of elements is meaningful—thus, for example the tuple (a, b, b) is different from the tuple (a, b).

As used herein, a "set" means a collection of elements. For ease of description, a set may be denoted herein by braces containing a list of elements that are separated by commons, such as {a, b, c}. It should be understood that the above described notation is merely used for convenience, and does not imply any limitation as to the form in which a set may be represented in example systems described herein. Unlike a tuple, the order of elements in a set does not matter—thus, for example the set {a, b, c} is identical to the set {c, b, a}. In addition, unlike a tuple, in a set repetition of elements has no meaning—thus, for example the set {a, b, b} is identical to the set {a, b}. Since a set may include multiple distinct subsets, occasionally multiple distinct sets may be referred to herein as a single set for convenience. For example, "a set of probability parameters" may be referred to occasionally, and in certain examples this set of parameters may include multiple distinct sets (such as a set Q comprising q-values and a set E comprising e-values).

As used herein, a "training program" comprises a tuple of lexemes with associated tokens. In this context, "a tuple of lexemes with associated tokens" means a tuple in which each element includes a lexeme, and in addition an identification of an associated token for each of the lexemes. The identification of associated tokens for the lexemes may be included, for example, as part of the same tuple that includes the lexemes, as part of a separate tuple, or in any other format that is capable of conveying which tokens correspond to which lexemes. For example, in a first example format, a training program may comprise a single tuple, where each element of the tuple comprises a lexeme and its corresponding token (i.e., each element is a lexeme-token pair). As another example, in a second example format, each training program may comprise two separate tuples—a lexeme tuple and a token tuple—where the positions of the lexemes and tokens within their respective tuples indicate which tokens correspond to which lexemes (e.g., the first token corresponds to the first lexeme, the second token corresponds to the second lexeme, etc.).

As noted above, there are various ways in which a tuple can be written or represented, and the tuple(s) of a training program may be written in any format. Similarly, a lexeme-token pair could be written or represented in any number of ways—for example, "lexeme/token", "lexeme-token", "<lexeme,token>", "[lexeme,token]", "lexeme token", "lexeme.token", etc.—and if a training program includes lexeme-token pairs then any format may be used to represent the lexeme-token pair. For example, in the first example format, the tuple may be written as a stream of lexeme-token pairs that are each separated from one another by whitespace, with each lexeme-token pair being written as the lexeme followed by a slash ("/") followed by the token, such as: "$x_1/y_1\ x_2/y_2\ \ldots\ x_N/y_N$" where "$x_i$" is the $i^{th}$ lexeme of the training program and "$y_i$" is the token for the $i^{th}$ lexeme $x_i$. As another example, in the second example format, the lexeme tuple may be written as a stream of lexemes that are each separated from one another by whitespace and the token tuple may be written as a stream of tokens that are each separated from one another by whitespace, such as: "$x_1\ x_2\ \ldots\ x_N$" and "$y_1\ y_2\ \ldots\ y_N$", where "$x_i$" is the $i^{th}$ lexeme of the training program and "$y_i$" is the token for the $i^{th}$ lexeme $x_i$.

As used herein, a "regular expression" for a programming language is a sequence of characters that defines a search pattern for searching for lexemes of the programming language, where a single given search pattern may be capable of matching multiple distinct lexemes. A regular expression may include regular characters and metacharacters, where the regular characters stand simply for their regular literal meaning (e.g., "a" means "a") and the metacharacters have a special meaning (e.g., "|" may mean "Boolean or", "." may mean "any single character", "*" may mean "the preceding element zero or more times", etc.). A complete set of regular expressions for a programming language comprises a set of regular expressions that collectively covers every possible lexeme that could be used in the programming language. In other words, if a set of regular expressions for a programming language is complete, then each and every possible valid lexeme of the programming language should be matched by at least one of the regular expressions in the set. Of course, there may be infinitely many possible lexemes in a programming language, but this does not prevent a complete set of regular expression from being created, since it is possible for a regular expression to match infinitely many lexemes (e.g., a regular expression "[a-z]*" matches any contiguous string of lowercase letters regardless of length, and thus covers infinitely many possible lexemes).

DETAILED DESCRIPTION

Generally, a lexical analyzer is configured for a particular programming language, and might not be able to appropriately analyze a program written in a programing language that the analyzer is not configured for, since different programing languages may have different types of lexemes and tokens. In certain examples described herein, a lexical analysis system may automatically generate and configure a lexical analyzer for an arbitrary programming language by learning from classified samples of programs in the programing language. In particular, a user may supply training programs in a given programming language, comprising sample programs with tokens identified for the lexemes thereof, and the lexical analysis system may automatically generate a lexical analyzer for the programming language based on the training programs.

Specifically, example lexical analysis systems may include instructions for a universal lexical analyzer that is to evaluate a function that maps input lexemes to corresponding output tokens based on certain parameters. This universal lexical analyzer may be configured for a specific programming language by using a set of values that are determined for the programming language as the parameters of the function. The set of values for a given programming language may be determined based on training programs in the given programming language that are input to the lexical analysis system (each of the training programs comprising an ordered list (i.e., tuple) of lexemes with corresponding tokens). For example, the set of values for a given programming language may include probabilities for token-sequences and probabilities for lexeme-token pairs determined from the training programs of the given programming language. The lexical analyzer is "universal" in the sense that it can be used for analyzing any programing language as long as the appropriate set of values corresponding to that programing language have been plugged in as the parameters of the function.

In general, the more training programs that are used to generate the probability parameters for a given programming language, the more accurate an example lexical analyzer configured for the given programming language may be. Furthermore, in certain circumstances, the group of training programs for a given programming language should include an example of each possible token in the programming language to ensure the highest accuracy.

For example, using example techniques described herein, the inventors generated a lexical analyzer configured for the C programming language using ten training programs that collectively included an example of each possible token in the C programming language, and this lexical analyzer was able to identify tokens for a test program with 94% accuracy. As another example, when the same lexical analyzer was retrained using 53 training programs (the original ten plus 43 more), the lexical analyzer was able to identify tokens for the test program with 100% accuracy. Of course, the number of training programs that may be needed to achieve a desired level of accuracy may vary depending on the nature of the training programs that are used and the target programming language, and thus the specific numbers in the forgoing results may not be meaningful in all contexts. However, the foregoing results do tend to broadly illustrate that, all other things being equal, greater accuracy may be achieved by using more training programs, as well as the fact that, at least in certain circumstances, a high level of accuracy may be achieved with even relatively few (e.g., less than a hundred) training programs.

Thus, in certain examples described herein, actions a user performs in order to obtain a lexical analyzer configured for a given programming language may include obtaining a number of sample programs in the programing language that collectively include an example of each token in the programming language, identifying the tokens of the lexemes in the sample programs to create training programs, and feeding the training programs to one of the example lexical analysis systems described herein. However, in certain examples described herein, the user does not need to specify any regular expressions for the programming language, much less a complete list of regular expression for the programming language. This is in contrast to certain other techniques for creating a lexical analyzer configured for a particular programming language in which a user may need to specify a complete list of regular expressions for the programming language, which are then input to a program (such as Flex or Bison) that is able to generate a lexical analyzer from the regular expressions.

In general, the actions a user performs to obtain a lexical analyzer configured for a programming language using examples described herein are much less time consuming, require much less effort, and are much less prone to error, than the actions a user performs as part of techniques that rely on regular expressions. In particular, obtaining a group of sample programs in a programming language and identifying tokens for the lexemes of the sample programs generally takes much less time and much less effort, and is much less prone to error, than specifying a complete list of regular expressions for a programming language. In particular, a complete list of regular expressions for a programming language generally must cover any and all possible lexemes that could be used in the programming language, and thus specifying a complete list of regular expressions may be very complicated (and hence prone to error), may require a high level of knowledge about both the target programming language and regular expressions, and may take a substantial amount of time and effort. Moreover, certain collections of regular expressions may result in a less efficient lexical analyzer than other collections of regular expressions, and therefore a user may need to spend additional time and effort in specifying the regular expressions if the user wishes to avoid such inefficiencies. Although the amount of time and effort may vary from one language to the next and from one user to the next, it may take on the order of weeks or even months to come up with a satisfactory complete list of regular expressions, whereas obtaining the training programs as described herein might be accomplished on the order of hours or days.

In addition, in certain examples described herein, as a programming language changes and evolves, a user may easily update a lexical analyzer for the programming language. For example, a user may update the lexical analyzer by inputting new training programs in the programming language that are reflective of the changes to the programming language, which may be used by the platform to obtain updated parameter values for the programming language. For certain changes to the programming language, the previously used training programs may be used together with the new training programs, while for other changes, the new training programs may be used by themselves. In contrast, in approaches that rely on regular expressions, when a programming language changes the user may need to specify new regular expressions or change previous regular expressions. In general, generating the new training programs will require less work and be less prone to error than specifying new regular expressions or changing previous regular expressions. In particular, changing a regular expression or adding a new regular expression may affect the other regular expressions (e.g., may cause some to fail), and therefore the complete set of expressions may need to be reconsidered carefully even if merely a single expression is to be added/changed.

[Example Lexical Analysis Systems]

Figure 2:
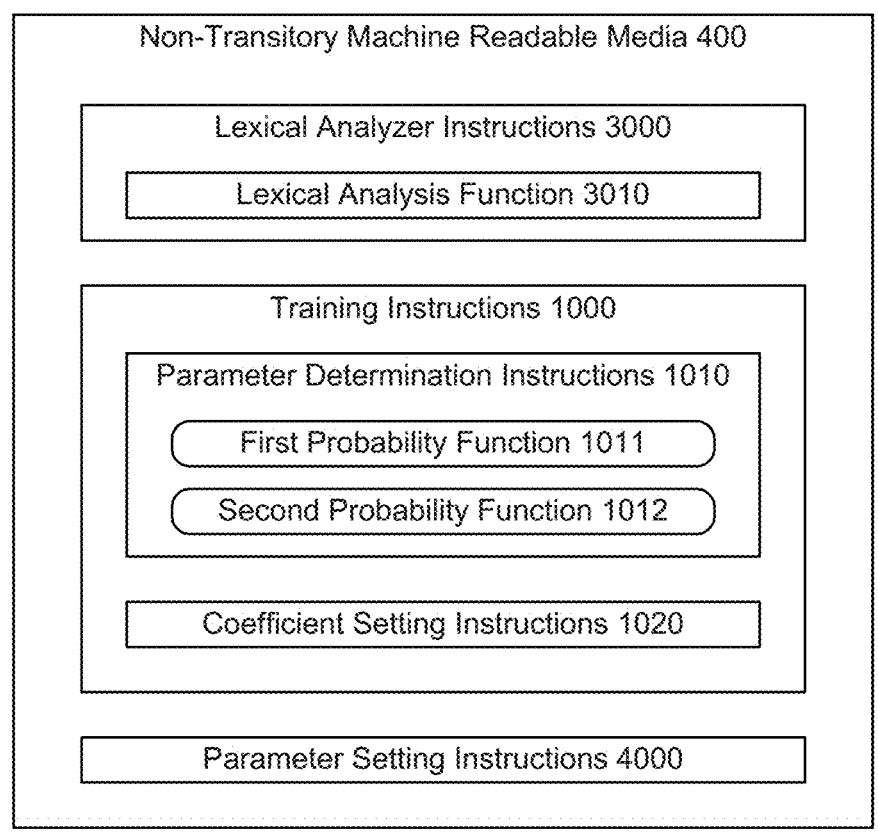
FIG. 2 illustrates example non-transitory machine-readable media storing example machine readable instructions, including example lexical analyzer instructions and example training instructions.

FIG. 1 illustrates an example lexical analysis system 10. The example lexical analysis system 10 comprises an analyzer trainer 100, storage media 200, and a universal lexical analyzer 300. FIG. 2 illustrates example machine readable instructions stored in non-transitory machine readable media 400. Certain components of the example lexical analysis system 10 may comprise processing circuitry executing various instructions illustrated in FIG. 2, and therefore FIG. 1 and FIG. 2 will be described together below.

The analyzer trainer 100 may receive training programs for a given programming language and generate a set of probability parameters for the given programming language based on the training programs. The set of probability parameters for the given programming language may be written to the storage media 200, and then may be input from the storage media 200 to the lexical analyzer 300 as the input probability parameters of a function used by the lexical analyzer 300 for lexical analysis. As a result of inputting the set of probability parameters for the given programming language as the input probability parameters of the function, the lexical analyzer 300 is configured for the given programming language. An input program in the given programming language may then be analyzed by the lexical analyzer 300 by evaluating the function, which results in lexeme/token pairs being output.

[Example Analyzer Trainer and Training Instructions]

The analyzer trainer 100 may be formed by processing circuitry (such as the processing circuitry 702 or 802) executing training instructions 1000. In other words, the analyzer trainer 100 may comprise a runtime instance of the training instructions 1000. The training instructions 1000 may include instructions that, when executed, cause the analyzer trainer 100 to generate a set of probability parameters for a programming language based on input training programs in the programming language. The training instructions 1000 may be capable of generating a set of probability parameters for any programming language, as long as input training programs in the programming language are provided.

Note that in this context being capable of generating a set of probability parameters for "any" programing language does not imply anything with regard to the quality of the probability parameters that are generated for each programing language. Instead, in this context being capable of generating a set of probability parameters for "any" programing language merely implies that some set of probability parameters can be generated from a collection of training programs. The quality of the set of probability parameters for a given programming language may depend, for example, on how many training programs are used, whether the training programs cover all types of tokens in the language, the nature of the programing language itself, and so on.

In particular, the training instructions 1000 may include parameter determination instructions 1010 that generate the set of probability parameters by receiving training programs that are in the respective programming language, each comprising a tuple (i.e., ordered list) of lexemes with corresponding tokens identified, and determining the set of probability parameters for the respective programming language based on lexemes and tokens in the training programs that are in the respective programming language. For example, the parameter determination instructions 1010 may include instructions to perform the process illustrated in FIG. 3 and described below.

For example, the probability parameters may include q-values and e-values, where each of the q-values is a probability corresponding to a token-sequence from one of the training programs and each of the e-values is a probability corresponding to a lexeme-token pair from one of the training programs. A token-sequence is a sequence of consecutive tokens in one of the training programs (or a sequence of placeholders and consecutive tokens). A lexeme-token pair is a lexeme from one of the training programs and its corresponding token.

In certain examples, the token-sequences for which q-values are determined include each sequence of M consecutive tokens in the training programs, where M is an integer greater than or equal to 2. Token-sequences having M consecutive tokens may be represented by a tuple having the form $(y_{i-M+1}, y_{i-M+2}, \ldots, y_{i-1}, y_i)$. In addition to determining q-values for token-sequences that have M tokens, q-values may also be determined for a few token-sequences that are at the beginning (or end) of a training program that include less than M tokens. For example, q-values may be determined for the M−1 token-sequences $(y_1)$, $(y_1, y_2), \ldots, (y_1, y_2, y_{M-1})$, hereinafter referred to as "beginning token-sequences". In certain examples, the token-sequences that have less than M tokens may have a number of placeholder elements added to them, such that they each have M total elements, where the placeholder elements indicate a start (or end) of the training program. Thus, for example, if M=3, then the token-sequences for which q-values are determined for a training program having n tokens would include the sequences: (start, start, $y_1$), (start, $y_1$, $y_2$), ($y_1, y_2, y_3$), ($y_2, y_3, y_4$), ..., ($y_{n-2}, y_{n-1}, y_n$), where "start" is a placeholder element indicating a start of the training program.

The q-values may be identified by reference to their corresponding token-sequence. In examples in which q-values are determined for token-sequences having M=3 consecutive tokens, the notation $q_{a, b, c}$ may be used herein to identify a q-value that corresponds to the token-sequence (a, b, c).

The parameter determination instructions 1010 may include a first probability function 1011 that maps an input token-sequence to a q-value that represents a probability of a last token of the token-sequence in view of the preceding tokens in the token-sequence. In other words, if the input token-sequence is $(y_{i-M+1}, y_{i-M+2}, \ldots, y_{i-1}, y_i)$, the first probability function 1011 outputs a q-value for the token-sequence equal to $P(y_i | y_{i-m+1}, y_{i-m+2}, \ldots, y_{i-1})$, where the notation P(u|v) means "the probability of 'u' in view of 'v'. For example, if M=3, then the first probability function 1011 may include a function $q_1$ (a,b,c) that maps a token-sequence (a, b, c) as an input variable to the q-value $q_{a,b,c}$ where:

$$q_1(a,b,c) = q_{a,b,c} = P(c|a,b) \qquad \text{(eq. 1)}$$

The term P(c|a,b) from eq. 1 (i.e., the probability of c in view of (a, b)) may be estimated using any probability model. For example, equation 1 may be estimated by using the following model:

$$\begin{aligned} q_1(a, b, c) &= q_{a,b,c} \\ &= P(c \mid a, b) \\ &= \lambda_1 \left( \frac{\text{count}(a, b, c)}{\text{count}(a, b)} \right) + \lambda_2 \left( \frac{\text{count}(b, c)}{\text{count}(b)} \right) + \\ &\quad \lambda_3 \left( \frac{\text{count}(c)}{\# \text{ of lexemes}} \right) \end{aligned} \qquad \text{(eq. 2)}$$

Herein, $\lambda_1$, $\lambda_2$, and $\lambda_3$ are coefficients, the notation "count( . . . )" means the number of occurrences in all of the training programs of the token-sequence "( . . . )", and "# of lexemes" is the total number of lexemes in all of the training programs. In certain examples, the values of the coefficients $\lambda_1$, $\lambda_2$, and $\lambda_3$ may be fixed, while in other examples the value of the coefficients $\lambda_1$, $\lambda_2$, and $\lambda_3$ may be adjustable. In certain examples, a producer of the training instructions 1000 may determine appropriate values for the coefficients $\lambda_1$, $\lambda_2$, and $\lambda_3$ and include those values in the parameter determination instructions 1010. In certain examples, values for the coefficients $\lambda_1$, $\lambda_2$, and $\lambda_3$ may be determined after the training instructions 1000 have been produced and may be set during runtime. For example, a user of the analyzer trainer 100 may determine values for the coefficients $\lambda_1$, $\lambda_2$, and $\lambda_3$ and set the values via an interface of the analyzer trainer 100. As another example, the analyzer trainer 100 may itself automatically determine values for the coefficients $\lambda_1$, $\lambda_2$, and $\lambda_3$ by calling coefficient setting instructions 1020.

The parameter determination instructions 1010 may also include a second probability function 1012 that maps an input lexeme-token pair to an e-value that represents a probability of the lexeme in view of the token. In other words, if the input lexeme-token pair is $[x_i, y_i]$, where is the $i^{th}$ lexeme and $y_i$ is the $i^{th}$ token in a given training program, then the second probability function 1012 may output an e-value for the lexeme-token pair that is equal to $P(x_i | y_i)$. The e-values may be identified by reference to their corresponding lexeme-token pair; for example, the notation $e_{x,c}$ is used herein to identify an e-value that corresponds to the lexeme-token pair [x,c], where x stands for the lexeme and c stands for the corresponding token. The second probability function 1012 may include a function e(x, c) that maps a lexeme-token pair [x, c] as an input variable to the e-value $e_{x,c}$, which may be given by:

$$e(x, c) = e_{x,c} = P(x|c) \qquad \text{(eq. 3)}$$

The term P(x|c) from eq. 3 (i.e., the probability of lexeme x in view of token c) may be estimated using any probability model. For example, equation 3 may be estimated by using the following model:

$$e(x, c) = e_{x,c} = P(x|c) = \frac{\text{count}[x, c]}{\text{count}(c)} \qquad \text{(eq. 4)}$$

Herein, "count[x,c]" is the number of times the lexeme-token pair "[x,c]" appears in all of the training examples (i.e., the number of times the lexeme x is associated with the token c in all of the training examples).

The first probability function 1011 may be used to determine a q-value for each token-sequence of M consecutive tokens in each of the training programs and to determine a q-value for the M−1 beginning token-sequences in each of the training programs. The second probability function 1012 may be used to determine an e-value for each lexeme-token pair in each of the training programs. If a particular token-sequence or a particular lexeme-token pair appears in multiple training programs, the q-value or e-value for that token-sequence or lexeme-token pair may be determined once and duplicative calculations may be omitted. Each distinct q-value $q_{a,b,c}$ that is output by the function $q_j$(a,b,c) for a $j^{th}$ programing language may be added to a set of q-values for the programming language, while each distinct e-value $e_{x,c}$ that is output by the function e(x, c) for a $j^{th}$ programing language may be added to a set of e-values $E_j$ for the programming language. The training instructions 100 may include instructions to write the sets $Q_j$ and $E_j$ to a storage medium, such as the storage media 200. The sets $Q_j$ and $E_j$ may be written and/or stored in any convenient form, for example as arrays, matrices, tables, text files, spreadsheets, xml files, etc. In certain examples, each q-value may be associated in the set with its corresponding token-sequence such that the set may be searched on the basis of token-sequences; for example, the set $Q_j$ may be an associative array in which q-values are values and token-sequences are keys. In certain examples, each e-value may be associated in the set $E_j$ with its corresponding lexeme-token pair, such that the set $E_j$ may be searched on the basis of lexeme-token pairs; for example, the set $E_j$ may be an associative array in which e-values are values and lexeme-token pairs are keys.

In certain examples, the training instructions 1000 may also include coefficient setting instructions 1020. The coefficient setting instructions 1020 may include instructions to set coefficients of a function that is used by the parameter determination instructions 1010 to determine the probability parameters. For example, the coefficient setting instructions 1020 may include instructions to perform the process illustrated in FIG. 4 and described below.

For example, the coefficient setting instructions 1020 may include instructions to set the coefficients $\lambda_1$, $\lambda_2$, and $\lambda_3$ of the first probability function 1011 (as represented in equation 2) to initial values, determine $Q_n$ and $E_n$ for an $n^{th}$ programming language based on training programs, configure an instance of the lexical analyzer 300 using $Q_n$ and $E_n$, test the accuracy of the lexical analyzer 300 using a test program, and determine whether the accuracy satisfies a threshold condition. If the accuracy threshold is not satisfied, then the value(s) of one or more of the coefficients $\lambda_1$, $\lambda_2$, and $\lambda_3$ may be adjusted, new values for the set $Q_n$ may be determined based on the adjusted coefficients, and the accuracy of the lexical analyzer 300 may be tested again with the new values for $Q_n$. This may be repeated until the desired level of accuracy is reached, at which point the current values for the coefficients $\lambda_1$, $\lambda_2$, and $\lambda_3$ may be stored for future use. The testing of the accuracy may be achieved, for example, by inputting a program to the lexical analyzer 300 for which the correct set of tokens is known, and comparing the tokens output by the lexical analyzer 300 to the known correct tokens.

In certain examples, once values have been determined for the coefficients based on a given programing language, the same values may be used for all other programming languages. In other examples, different values of the coefficients may be determined for different programming languages.

In certain examples, the entire process of determining the coefficients may be done automatically by the coefficient setting instructions 1020 (apart from the inputting of the training programs, the test program, and the set of correct tokens for the test program, which may be done by a user). For example, the coefficient setting instructions 1020 may send commands to the parameter determination instructions 1010, to the parameter setting instructions 4000, and to the lexical analyzer 300 that are configured to cause the sets $Q_n$ and $E_n$ to be determined, cause the lexical analyzer 300 to be configured using the sets $Q_n$ and $E_n$, and cause the lexical analyzer 300 to analyze the test program. In addition, the coefficient setting instructions 1020 may automatically test the accuracy of the lexical analyzer 300. In addition, the coefficient setting instructions 1020 may automatically adjust the values of the coefficients. In certain examples, the coefficient setting instructions 1020 may automatically adjust the values of the coefficients when the accuracy of the lexical analyzer 300 does not satisfy a threshold condition, and may cease adjusting the values once a threshold level of accuracy is reached. For example, the values may be incremented in specified orders and by specified increments each time that they are adjusted. As another example, the values may be set to random values each time that they are adjusted. In certain examples, coefficient setting instructions 1020 may automatically adjust the values of the coefficients so as to find optimum values for them (e.g., values that produce the highest accuracy), using any known optimization algorithm such as, for example, a Monte Carlo algorithm.

In certain examples, a user may perform some portions of the process of determining the coefficients. For example, a user may adjust the coefficients $\lambda_1$, $\lambda_2$, and $\lambda_3$ to values of their choosing, in which case the coefficient setting instructions 1020 may include instructions to provide functionality for a user to make such adjustments, such as, for example, providing a user interface whereby the user may specify values for the coefficients $\lambda_1$, $\lambda_2$, and $\lambda_3$. As another example, the user may determine the accuracy of the lexical analyzer 300. As another example, the user may make the determination to adjust the coefficients based on the accuracy.

[Example Storage Media]

The storage media 200 may be to receive the probability parameters (e.g., the q-values and e-values) output by the analyzer trainer 100, store the probability parameters, and to provide probability parameters to the universal lexical analyzer 300. The storage media 200 may include any non-transitory computer readable media. For example, the storage media 200 may include non-volatile storage media such as a solid-state storage (e.g., solid-state drives, USB flash drives, flash storage cards (e.g., secured digital (SD) cards, etc.)) a hard disk drive, an optical disk (e.g., CD, DVD, BlueRay, etc.), a magnetic disk (e.g., floppy disk), etc. As another example, the storage media 200 may include volatile storage media, such as dynamic random access memory (DRAM), static random access memory, (SRAM), etc.

As noted above, the sets $Q_j$ and $E_j$ may be written by the analyzer trainer 100 to the storage media 200 as, for example, arrays, matrices, tables, text files, spreadsheets, xml files, etc. In certain examples, the sets $Q_j$ and $E_j$ may be stored as persistent files in non-volatile media that is part of the storage media 200. In certain examples, the sets $Q_j$ and $E_j$ may be stored in volatile memory (such as main memory of a computing device) as data directly available to the processing circuitry of the lexical analyzer 300.

In certain examples, the analyzer trainer 100 and the storage media 200 may be part of the same computing device. However, in other examples the analyzer trainer 100 and the storage media 200 may be part of different computing devices. For example, the storage media 200 may be communicably connected to the analyzer trainer 100 via a network (not illustrated), such as the internet, and the probability parameters may be communicated from the analyzer trainer 100 to the storage media 200 via the network.

In certain examples, the universal lexical analyzer 300 and the storage media 200 may be part of the same computing device. However, in other examples the universal lexical analyzer 300 and the storage media 200 may be part of different computing devices. For example, the storage media 200 may be communicably connected to the universal lexical analyzer 300 via a network (not illustrated), such as the internet, and the probability parameters may be communicated from the storage media 200 to the universal lexical analyzer 300 via the network.

In certain examples, the storage media 200 may store the various instructions illustrated in FIG. 2, in addition to storing the probability parameters (i.e., the storage media 200 and the non-transitory machine readable media 400 may be part of the same storage device). However, in other examples the storage media 200 and the non-transitory machine readable media 400 may be separate devices.

[Example Universal Lexical Analyzer and Lexical Analyzer Instructions]

The universal lexical analyzer 300 may be formed by processing circuitry (such as the processing circuitry 702 or 902) executing lexical analyzer instructions 3000. In other words, the universal lexical analyzer 300 may comprise a runtime instance of the lexical analyzer instructions 3000. The lexical analyzer instructions 3000 may include instructions that, when executed, cause the universal lexical analyzer 300 to lexically analyze an input program by evaluating a lexical analysis function 3010.

The universal lexical analyzer 300 may be configurable for any programming language by inputting a set of probability parameters for the respective programming language as the input probability parameters of the lexical analysis function 3010. In other words, the analyzer 300 may be capable of being configured for any programming language. This is in contrast to, for example, the analyzer merely being capable of being configured for a specific group of programming languages. Thus, the universal lexical analyzer 300 is "universal" in the sense that it is possible to configure it for any programming language for which a set of probability parameters have been obtained.

Note that in this context being configured for a programing language does not imply anything with regard to how well the universal lexical analyzer 300 performs on the programming language; for example, being configured for a programing language does not imply that some specific level of accuracy will necessarily be achieved in analyzing programs in the programming language. Instead, in this context the universal lexical analyzer 300 being "configured for" a programming language merely implies that probability parameters for that programing language have been input to the lexical analysis function 3010. How well the universal lexical analyzer 300 performs in analyzing a particular programming language may depend on the quality of the probability parameters that were obtained for that programming language. Moreover, the use of "universal" and "any programming language" in this context should not be interpreted to imply that the universal lexical analyzer 300 necessarily performs equally well for any programming language. Moreover, the usage of the word "universal" should not be interpreted to imply that there is a single configured state in which the universal lexical analyzer 300 is able to analyze any programming language without needing to be reconfigured (i.e., that the analyzer 300 is somehow configured for all programming languages at the same time). Rather, the universal lexical analyzer 300 is configured for one programming language at a time—in particular, at any given time the universal lexical analyzer 300 is configured for whichever programming language corresponds to the probability parameters that are currently being used as the input probability parameters of the lexical analysis function 3010.

The lexical analysis function 3010 maps an input variable comprising a tuple of lexemes to an output variable comprising a tuple of tokens based on input probability parameters. For example, the input tuple of lexemes may correspond to a computer program that is to be analyzed by the universal lexical analyzer. In general, the tuple of lexemes may be input to the universal lexical analyzer 300 in any format in which the lexemes of the program may be identified by the analyzer 300. For example, the tuple of lexemes may be input to the universal lexical analyzer 300 as a stream of lexemes separated by whitespace, such as "$x_1$ $x_2$ . . . $x_n$". In certain examples, a computer program that is to be analyzed might not initially be in a desired format for the universal lexical analyzer 300, in which case the computer program may be translated into such a format for the analysis. For example, a user may manually convert a program into the desired format prior to inputting it to the universal lexical analyzer 300. As another example, the universal lexical analyzer 300 may include a pre-processing stage (not illustrated) that is to convert a computer program into a desired format of the lexical analyzer 300. For example, such a pre-processing stage may be formed by executing pre-processing instructions that may include instructions to: remove excess whitespace, remove comments, and add whitespace between any lexemes not already separated by whitespace. For example, such a pre-processing stage may convert the computer program comprising the stream of characters "void func(int x) {console.write(x);}// console function" into the tuple comprising the stream of characters: "void func (int x) {console.write (x);}" by removing the comment "//console function" and the excess whitespace before this comment and adding whitespace between lexemes.

The input probability parameters of the lexical analyzer function 3010 may be given particular values by inputting a set of probability parameter values from the storage media 200 as the input probability parameters. The universal lexical analyzer 300 is configured for a given programming language when a set of probability parameters for the given programming language has been input as the input probability parameters of the lexical analysis function 3010.

For example, the input probability parameters of the lexical analyzer function 3010 may include a variable set $\mathbb{Q} = \{q_k\}$ and a variable set $\mathbb{E} = \{e_p\}$, where the index k identifies a token-sequence and the index p identifies a lexeme-token pair. The variable sets $\mathbb{Q}$ and $\mathbb{E}$ may initially be empty, and may be filled by inputting specific sets $Q_j$ and $E_j$ from the storage media 200 to the lexical analyzer instructions 3000 as the variable sets $\mathbb{Q}$ and $\mathbb{E}$, respectively. Inputting sets $Q_j$ and $E_j$ as the variable sets $\mathbb{Q}$ and $\mathbb{E}$ means adding the q-values of the set $Q_j$ as the parameters $q_k$ of the variable set $\mathbb{Q}$ and adding the e-values of the set $E_j$ as the parameters $e_p$ of the variable set $\mathbb{E}$. Adding the q-values of the set $Q_j$ as the parameters $q_k$ of the variable set $\mathbb{Q}$ and adding the e-values of the set $E_j$ as the parameters $e_p$ of the variable set $\mathbb{E}$ may be done by any convenient method: for example, a pointer from the variable-set $\mathbb{Q}$ may be caused to point to a memory address storing the set $Q_j$ and a pointer from the variable-set $\mathbb{E}$ may be caused to point to a memory address storing the set $E_j$.

In certain examples, the lexical analyzer function 3010 may include a function that returns an estimate of a most likely tuple of tokens $Y=(y_1, \ldots, y_n)$ in view of an input tuple of lexemes $X=(x_1, \ldots, x_n)$, based on the input probability parameter sets $\mathbb{Q}$ and $\mathbb{E}$ (note that the number of elements in Y is the same as the number of elements in X). For example, the lexical analyzer function 3010 may include a function f(X) given by:

$$f(X) = \text{Argmax}_Y[P(Y) \cdot P(X|Y)] \quad \text{(eq. 5)}$$

The probability P(Y) from equation 5 may be estimated using any probability model. For example, the probability P(Y) from equation 5 may be estimated as follows:

$$P(Y) = \prod_{k \in Y} q_k \quad \text{(eq. 6)}$$

In equation 5, the parameters $q_k$ are elements of the variable set $\mathbb{Q}$ as described above, with the index k representing a token-sequence. In equation 5, $k \in Y$ means "each value of k that represents: a token-sequence of M consecutive tokens in Y, or one of the M−1 beginning token-sequences in Y". As noted above, the values for the parameters $q_k$ are obtained from the set that has been input as the input parameter set $\mathbb{Q}$. For example, to obtain a value for a particular $q_k$, the lexical analyzer function 3010 may search the set $Q_j$ on the basis of the token-sequence k. The probability P(X|Y) from equation 5 may be given by:

$$P(X|Y) = \prod_{p \in X,Y} e_p \quad \text{(eq. 7)}$$

In equation 6, the parameters $e_p$ are elements of the variable set $\mathbb{E}$ as described above, with the index p representing a lexeme-token pair. In equation 6, $p \in X,Y$ means "each value of p that represents a lexeme-token comprising a lexeme from X and a corresponding token from Y". In other words, $p \in X,Y$ means $p \in \{[x_1, y_1], [x_2, y_2], \ldots, [x_n, y_n]\}$. As noted above, the values for the parameters $e_p$ are obtained from the set $E_j$ that has been input as the input parameter set $\mathbb{E}$. For example, to obtain a value for a particular $e_p$, the lexical analyzer function 3010 may search the set $E_j$ on the basis of the lexeme-token p. Combining equations 5-7 results in the following formulation for the function f(X):

$$f(X) = \text{Argmax}_Y\left[\prod_{k \in Y} q_k \cdot \prod_{p \in X,Y} e_p\right] \quad \text{(eq. 8)}$$

In examples in which M=3, equation 8 may be rewritten as:

$$f(X) = \text{Argmax}_Y\left[\prod_{i=1,\ldots,n} q_{y_{i-2},y_{i-1},y_i} e_{x_i,y_i}\right] \quad \text{(eq. 9)}$$

In equation 9, the term $q_{y_{i-2},y_{i-1},y_i}$ represents the q-value for the token-sequence $(y_{i-2}, y_{i-1}, y_i)$ and the term $e_{x_i,y_i}$ represents the e-value for the lexeme-token pair $[x_i, y_i]$, where the elements "y" are tokens in Y (or placeholders in the case of $y_0$ and $y_{-1}$) and the elements "x" are lexemes in X. Note that in this context, indexes of the elements "y" indicate their locations within Y (rather than their location within the respective token-sequence), and the indexes of the lexemes "x" indicate their location within X. Note that the elements $y_0$ and $y_{-1}$ represent placeholders that indicate a start of the training program. Thus, for example, $q_{y_2,y_3,y_4}$ is the q-value for the sequence $(y_2, y_3, y_4)$, where $y_2$ is the second token in Y, $y_3$ is the third token in Y, and $y_4$ is the fourth token in Y. As another example, $q_{y_0,y_1,y_2}$ is the q-value for the sequence (start, $y_1$, $y_2$), where "start" is a placeholder, $y_1$ is the first token in Y, and $y_2$ is the second token in Y. As another example, $e_{x_6,y_6}$ is the e-value for the lexeme-token pair $[x_6, y_6]$, where $x_6$ is the sixth lexeme in X and $y_6$ is the sixth token in Y.

The function f(X) may be evaluated in a variety of ways. For example, a "brute force" method of evaluating the function f(X) may include determining the value of the expression $\Pi_{k \in Y} q_k \cdot \Pi_{p \in X,Y} e_p$ for every possible tuple Y in view of X, and then identifying the tuple Y that results in the maximum value for the expression. However, other algorithms may also be used that might evaluate f(X) (exactly or approximately) more efficiently than the brute force method. For example, the trigram Viterbi algorithm with back-pointers may be used to evaluate f(X). A version of the trigram Viterbi algorithm with back-pointers that may be used to evaluate the function f(X) when M=3 is described below as Algorithm 1.

Algorithm 1

```
Inputs:
  X = (x₁, x₂, ..., xₙ)        //tuple of lexemes from input program
  Q = {q_{a,b,c}} = {P(c|a,b)}  //set of q-values for programming language
  E = {e_{x,c}} = {P(x|c)}      //set of e-values for programming language
  T                             //set of all tokens from the training programs
                                  of the programming language
Output:
  Y = (y₁, y₂, ..., yₙ)        //tuple of tokens that is most probable match
                                  for X
Procedure:
  For i = 1, ..., n
    For t ∈ T, r ∈ T
      V(i, t, r) = max_{t'}[V(i − 1,t',t)q_{t',t,r}e_{x_i,r}]
      BackPointer(i,t,r) = argmax_{t'} [V(i − 1,t',t)q_{t',t,r}e_{x_i,r}]
  Set y_{n-1},y_n = argmax_{t,r}[V(n,t,r)]
  For i = n−2, n−3, ..., 1
    set y_i = BackPointer(i + 2, y_{i+1},y_{i+2})
  return: Y = (y₁, y₂, ..., yₙ)
```

As noted above, evaluating the lexical analyzer function 3010 based on an input program results in a tuple of tokens $Y=\{y_1, \ldots, y_n\}$ being output. Each token in Y corresponds to the lexeme in $X=\{x_1, \ldots, x_n\}$ (the input program) that has the same position—i.e., the first token $y_1$ corresponds to the first lexeme the second token $y_2$ corresponds to the second lexeme $x_2$, and so on. The tuple Y may be output by the universal lexical analyzer 300 for use by downstream entities (such as a syntax analyzer). In certain examples, the universal lexical analyzer 300 may write the tuple Y to machine readable storage media, such as the storage media 200 or other storage media (not illustrated).

In certain examples, the lexical analyzer instructions 3000 may include instructions to combine the output tuple Y with the lexemes from the input program so as to produce a tuple K of lexeme-token pairs $[x_i, y_i]$, that is $K=\{[x_1, y_1], [x_n, y_n]\}$. The tuple K may be output by the universal lexical analyzer 300 for use by downstream entities (such as a syntax analyzer). In certain examples, the universal lexical analyzer 300 may write the tuple K to machine readable storage media, such as the storage media 200 or other storage media (not illustrated). Having an output in the form of a tuple of lexeme-token pairs (as opposed to merely a tuple of tokens) may be useful, for example, when a syntax analyzer that is to be used downstream of the universal lexical analyzer 300 is configured to receive lexeme-token pairs as inputs. In certain examples, for classifications that have exactly one lexeme, any elements in K that correspond to such a lexeme may include the token and omit the lexeme (since the lexeme is implied by the token).

[Example Parameter Setting Instructions]

The non-transitory machine readable media 400 may include parameter setting instructions 4000.

In certain examples, a copy of the lexical analyzer instructions 3000 might not initially correspond to any particular programming language, and an instance of the lexical analyzer 300 that is created from such an copy may need to be configured for a particular programing language while (or after) being created. In certain such examples, the parameter setting instructions 4000 may include instructions to configure an instance of the universal lexical analyzer 300 for a programing language by inputting the corresponding probability parameters to the instance of the analyzer 300 while (or after) being created.

In certain other examples, a copy of the lexical analyzer instructions 3000 may correspond to a programming language, and an instance of the lexical analyzer 300 that is created by running such a copy may already be configured for the corresponding programming language when created. In certain such examples, the parameter setting instructions 4000 may include instructions to configure a copy of the lexical analyzer instructions 3000 for a programming language by storing the corresponding probability parameters in association with the copy of the instructions 3000 such that a lexical analyzer 300 created by running the copy is automatically configured for the programming language when created.

In certain examples, the parameter setting instructions 4000 may include instructions to control the creation of instances of the universal lexical analyzer 300. For example, the parameter setting instructions 4000 may call a copy of the lexical analyzer instructions 3000 to create an instance of the universal lexical analyzer 300.

In certain examples, the parameter setting instructions 4000 may also include instructions to control the creation of copies of the lexical analyzer instructions 3000. For example, the parameter setting instructions 4000 may create a copy of the instructions 300 by copying a master copy of the lexical analyzer instructions 3000.

In examples in which a copy of the lexical analyzer instructions 3000 does not initially correspond to any particular programming language, when a user requests a lexical analyzer in a given programming language, the parameter setting instructions 4000 may call a copy of the lexical analyzer instructions 3000 to create an instance of the universal lexical analyzer 300 (if one does not already exist) and may then configure the analyzer 300 while (or after) creating it. Specifically, the parameter setting instructions 4000 may determine whether a set of probability parameters for the given programming language is available (for example stored in the storage media 200), and if no probability parameters for the given programming language are available, the parameter setting instructions 4000 may prompt the user for the parameters, and/or may call the training instructions 1000 to obtain the parameters. Upon obtaining the parameters, the instance of the universal lexical analyzer 300 may be configured (or reconfigured) using the parameters for the given programing language. In particular, the parameter setting instructions 4000 may include instructions to input a set $Q_j$ and a set $E_j$ from the storage media 200 to an instance of the universal lexical analyzer 300. For example, the parameter setting instructions 4000 may read the set $Q_j$ and the set $E_j$ from the storage media 200 and copy the sets $Q_j$ and $E_j$ to the instance of the universal lexical analyzer 300. As another example, the parameter setting instructions 4000 may provide the instance of the universal lexical analyzer 300 the addresses of the sets $Q_j$ and $E_j$ in the storage media.

In examples in which a copy of the lexical analyzer instructions 3000 does not initially correspond to any particular programming language, multiple instances of the universal lexical analyzer 300 may be created by running a single instance of the lexical analyzer instructions 3000 multiple times. In such examples, each instance of the lexical analyzer 300 may be configured for a different programing language, even though they all come from the same underlying copy of the instructions 3000.

In examples in which a copy of the lexical analyzer instructions 3000 corresponds to specific programming language, when a user requests a lexical analyzer in a given programming language, the parameter setting instructions 4000 may create an instance of the lexical analyzer 300 that is configured for the given programming language simply by calling the copy of the instructions 3000 that corresponds to the given programming language. For example, the parameter setting instructions 4000 may, in response to a request for a lexical analyzer, determine whether a copy of the lexical analyzer instructions 3000 exists that corresponds to the requested programming language, and if so may call the instance and/or direct the user to the instance. If no such copy exists, the parameter setting instructions 4000 may determine whether probability parameters for the given programing language are available, for example stored in the storage media 200. If no probability parameters for the programming language are available, the parameter setting instructions 4000 may prompt the user for the parameters, and/or may call the training instructions 1000 to obtain the parameters. Upon obtaining the parameters, the copy of the instructions 3000 that corresponds to the given programming language may be created by the parameter setting instructions 4000 by copying a master copy and storing the parameters in association with the new copy. The copy of the instructions 3000 may be created, for example, as an executable file. Upon creating the copy of the instructions 3000, the parameter setting instructions 4000 may call the copy, write the copy to storage media, and/or otherwise provide the copy to the user (e.g., transmit it over a network, etc.). In particular, the parameter setting instructions 4000 may include instructions to store a set $Q_j$ and a set $E_j$ from the storage media 200 in association with a copy of the lexical analyzer instructions 3000. For example, the parameter setting instructions 4000 may read the set $Q_j$ and the set $E_j$ from the storage media 200 and write the sets $Q_j$ and $E_j$ into the same file that contains the copy of the lexical analyzer instructions 3000.

In certain examples, the parameter setting instructions 4000 may include instructions to provide a user interface, whereby a user may request a lexical analyzer for a particular programing language.

[Example Methods]

Figure 3:
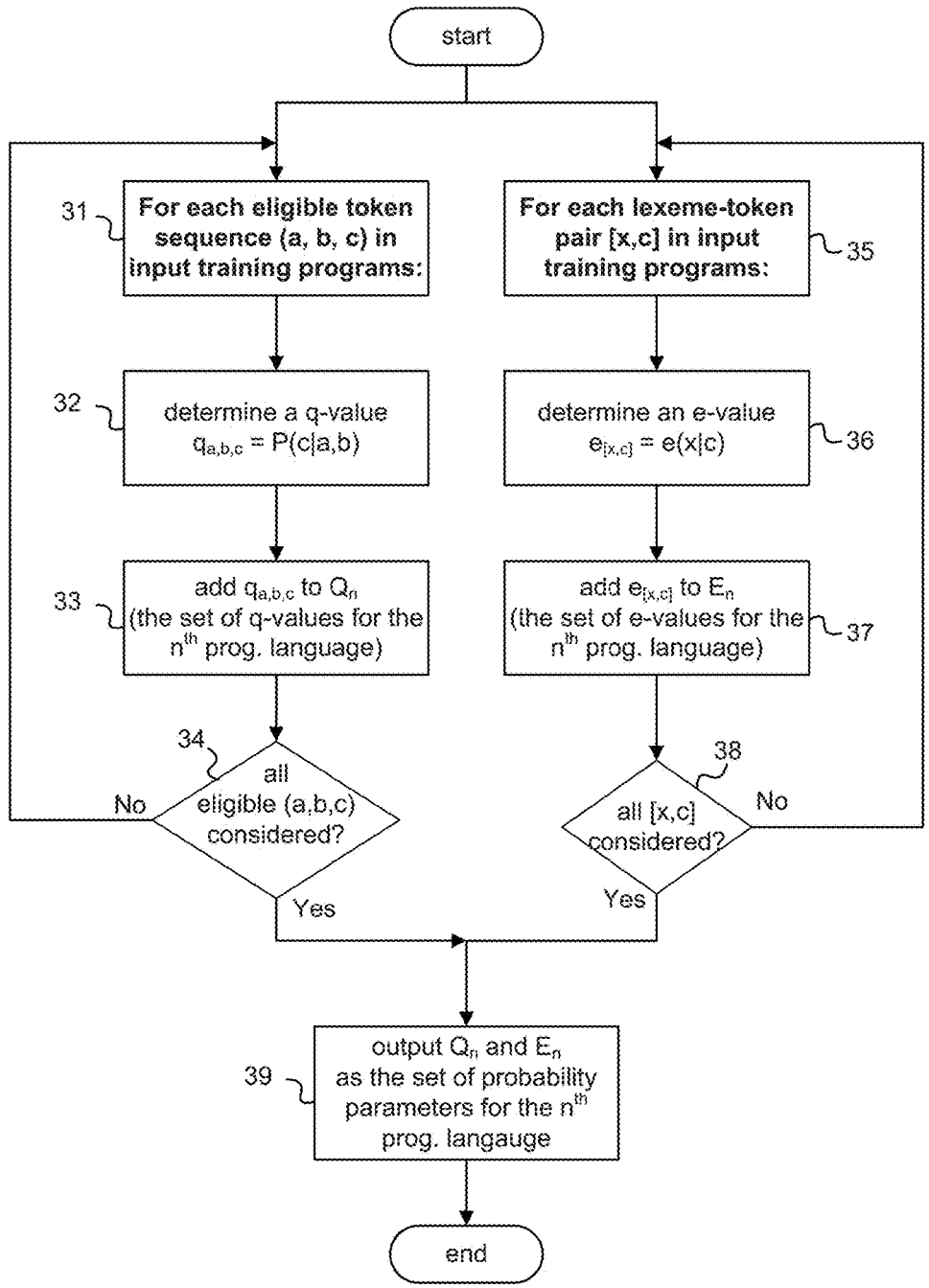
FIG. 3 illustrates an example method of determining a set of probability parameters for a given programing language based on input training programs.

FIG. 3 illustrates an example method of obtaining a set of probability parameters for a programing language based on a group of input training programs that are in the target programming language. The example method may include a collection of operations that are performed for each eligible token sequence in the group of input training programs (i.e., a loop comprising blocks 31-34) and a collection of operations that are performed for each lexeme-token pair in the group of input training programs (i.e., a loop comprising blocks 35-38). The loops of blocks 31-34 and blocks 35-38 may be performed partially or wholly in parallel and/or partially or wholly in serial.

In block 31, an eligible token sequence may be selected. The eligible token sequences may include any sequence of M consecutive tokens $(y_{i-M+1}, y_{i-M+2}, \ldots, y_{i-1}, y_i)$ in any training program of the group of input training programs, where M is an integer greater than or equal to 2 (the value of M is fixed throughout a given performance of the method). The eligible token sequences may also include any one of the beginning token-sequences $(y_1), (y_1, y_2), \ldots, (y_1, y_2, \ldots, y_{M-1})$ in any training program of the group of input training programs. When one of the beginning token sequences is selected, placeholder values (e.g., "start") may be added to the sequence to bring the number of elements in the sequence up to M. The token sequence that is selected in block 31 may be one that has not yet been selected during the current performance of the method; in other words, a different token sequence is selected each time through the loop of blocks 31-34. Note that it is possible that a given token sequence may be repeated multiple times throughout the group of training programs, and in such a case the given token sequence may be selected in block 31 a single time and duplicative instance of the given token sequence may be passed over. In FIG. 3, it is assumed that the token sequences each have three elements (i.e., M=3) for ease of illustration, but this is merely one example.

For example, when M=3 the selected token sequence may be any sequence of three consecutive tokens that is found in any training program of the group of input training programs. In addition, when M=3 the selected token sequence may be one of the sequences (start, start, α) or (start, α, β) in the group of input training programs, where "start" is a placeholder value indicating a start of one of the training programs, "α" is the first token in the training program, and "β" is the second token in the training program. In such examples, the selected token sequence may be represented as a tuple (a, b, c), where "a", "b", and "c" indicate the tokens or placeholders of the selected token sequence.

In block 32, a q-value is determined for the selected token sequence, where the q-value represents the probability of the last token in the sequence in view of the preceding tokens (or placeholders) in the sequence. In other words, the q-value for the token-sequence $(y_{i-M+1}, y_{i-M+2}, \ldots, y_{i-1}, y_i)$ is equal to $P(y_i | y_{i-m+1}, y_{i-m+2}, \ldots, y_{i-1})$.

For example, when M=3, a q-value $q_{a,b,c}$ is determined for the selected token sequence (a, b, c), where $q_{a,b,c}$ represents the probability of the token c in view of the tokens a and b—that is, $q_{a,b,c}=P(c|a,b)$. For example, $q_{a,b,c}$ may be determined by evaluating equation 2. Evaluating equation 2 may include counting the number of occurrences of the sequences (a, b, c), (a, b,), (b, c), (b), and (c) in the group of training programs, as well as counting the total number of lexemes. If the coefficients $\lambda_1$, $\lambda_2$, and $\lambda_3$ have not yet been determined, then any initial values may be used for these coefficients—for example, random values may be generated for the coefficients.

In block 33, the q-value may be added to the set $Q_n$, where "n" indicates the target programming language (i.e., $Q_n$ is the set of q-values for the $n^{th}$ programming language). For example, when M=3 the q-value $q_{a,b,c}$ may be added to the set $Q_n$. Although a token-sequence may occur multiple times in the group of training programs, a single q-value may be included in $Q_n$ for each distinct token-sequence in the group of training programs.

In block 34, it is determined whether each eligible token sequence in the group of training programs has been considered. If there are eligible token sequences that have not been considered (block 34=NO), then the process returns to block 31 and the look of blocks 31-34 is repeated. If there are no more eligible token sequences to consider (block 34=YES), then the process proceeds to block 39.

For example, when M=3, it is determined whether each eligible token sequence (a, b, c) in the group of training programs has been considered. In particular, when M=3, the loop of blocks 31-34 may be repeated until: each distinct sequence of three consecutive tokens in the group of input training programs has been considered, each of the sequences (start, start, a) in the group of input training programs has been considered, and each of the sequences (start, α, β) in the group of input training programs has been considered.

In block 35, a lexeme-token pair may be selected. The selected lexeme-token pair may be any lexeme that is found in any training program of the group of input training programs together with its corresponding token. The selected lexeme-token pair may be represented as a pair [x, c], where "x" indicates the lexeme and "c" indicates the token for the lexeme. The lexeme-token pair that is selected in block 35 may be one that has not yet been selected during the current performance of the method; in other words, a different lexeme-token pair is selected each time through the loop of blocks 35-38. Note that it is possible that a given lexeme-token pair may be repeated multiple times throughout the group of training programs, but in such a case the given lexeme-token pair may be selected in block 35 a single time.

In block 36, an e-value $e_{[x,c]}$ is determined for the selected lexeme-token pair [x, c], where $e_{[x,c]}$ represents the probability of the lexeme x in view of the token c—that is, $e_{[x,c]}=e(x|c)$. For example, $e_{[x,c]}$ may be determined by evaluating equation 4. Evaluating equation 4 may include counting the number of occurrences of the lexeme-token pair [x, c] in the group of training programs, as well as counting the number of occurrences of the token c.

In block 37, the e-value $e_{[x,c]}$ may be added to the set $E_n$, where "n" indicates the target programming language (i.e., $E_n$ is the set of e-values for the $n^{th}$ programming language). Although a lexeme-token pair may occur multiple times in the group of training programs, a single e-value may be included in $E_n$ for each distinct lexeme-token pair in the group of training programs.

In block 38, it is determined whether each lexeme-token pair [x, c] in the group of training programs has been considered. If there are lexeme-token pairs that have not been considered (block 38=NO), then the process returns to block 35 and the look of blocks 35-38 is repeated. If there are no more lexeme-token pairs to consider (block 38=YES), then the process proceeds to block 39.

In block 39, the sets $Q_n$ and $E_n$ are output as the set of probability parameters for the target programming language. For example, the sets $Q_n$ and $E_n$ may be written to a non-transitory machine readable storage medium, such as the storage media 200. The sets $Q_n$ and $E_n$ may be written in any convenient form, for example as arrays, matrices, tables, text files, spreadsheets, xml files, etc. In certain examples, each q-value may be associated in the set $Q_n$ with its corresponding token-sequence such that the set $Q_n$ may be searched on the basis of token-sequences; for example, the set $Q_n$ may be an associative array in which q-values are values and token-sequences are keys. In certain examples, each e-value may be associated in the set $E_n$ with its corresponding lexeme-token pair, such that the set $E_n$ may be searched on the basis of lexeme-token pairs; for example, the set $E_n$ may be an associative array in which e-values are values and lexeme-token pairs are keys. In block 39, the sets $Q_n$ and $E_n$ do not necessarily have to be output at the same time. For example, the set $Q_n$ may be output when the loop of blocks 31-34 is finished and the set $E_n$ may be output when the loop of blocks 35-38 is finished, and the loops of blocks 31-34 and blocks 35-38 do not necessarily have to finish at the same time. As another example, the block 39 may be performed after both of the loops of blocks 31-34 and blocks 35-38 have been completed.

Figure 4:
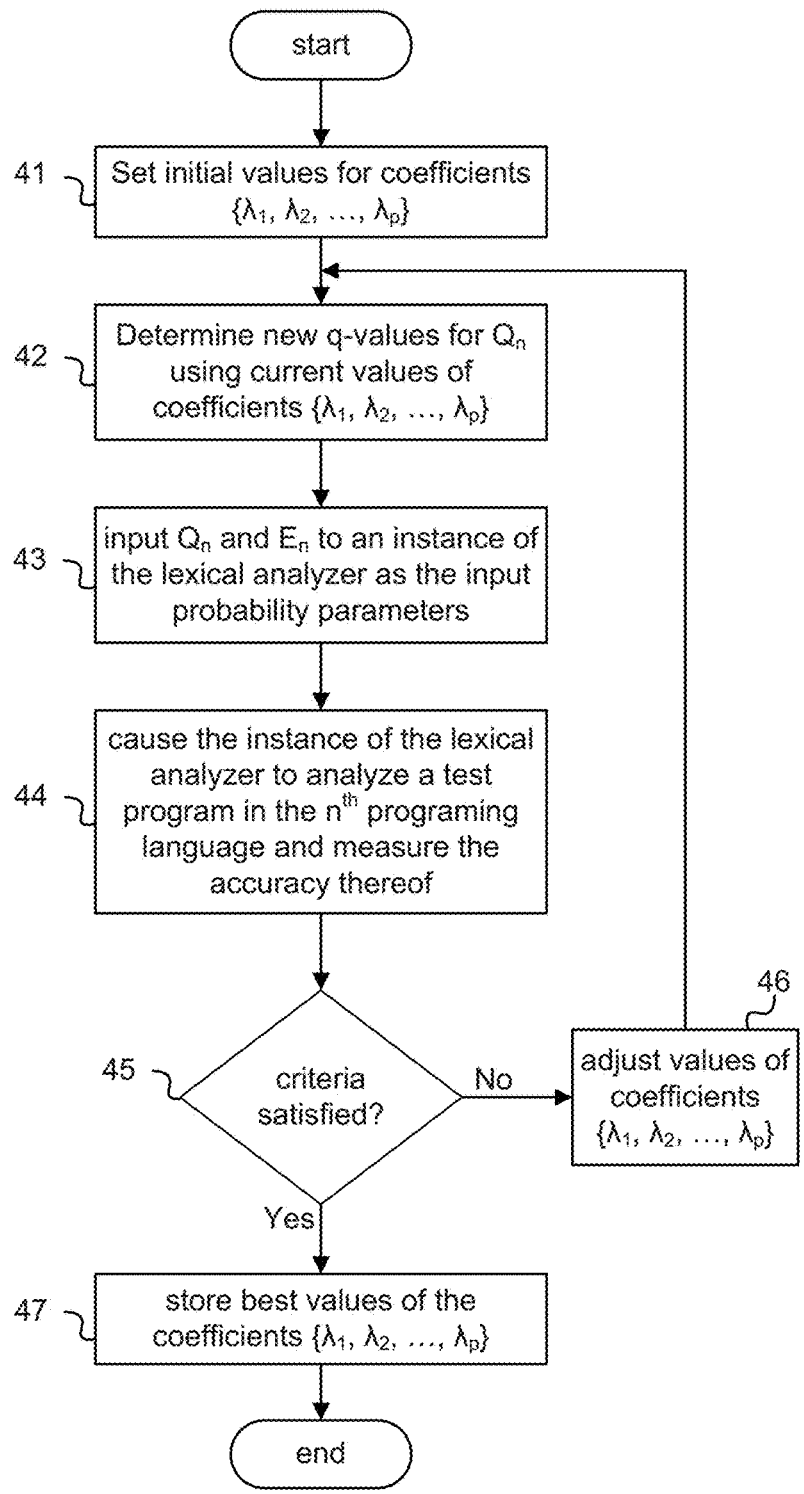
FIG. 4 illustrates an example method of tuning coefficients of a probability function that is used to determine probability parameters.

FIG. 4 illustrates a method of tuning values for the coefficients of a probability function that is used to determine probability parameters for a programming language. Depending on the probability function that is used, a different number of coefficients may need to be tuned, and thus the coefficients are represented in FIG. 4 as $\lambda_1, \ldots, \lambda_p$, where p is any integer. In examples in which the probability function includes equation 2, there are three coefficients (i.e., p=3), and thus the coefficients are $\lambda_1$, $\lambda_2$, and $\lambda_3$.

In block 41, initial values may be assigned for the coefficients $\lambda_1, \ldots, \lambda_p$. Any values may be used for the initial values. For example, random values between 0 and 1 may be assigned as the initial values.

In block 42 a set $Q_n$ of q-values for a given programming language may be determined using the current values of the coefficient, where n indicates the given programming language. In particular, a q-value may be determined for each eligible token-sequence in a group of input training programs for the given programming language by evaluating the probability function using the current values of the coefficients $\lambda_1, \ldots, \lambda_p$. For example, the process of FIG. 3 may be used to determine the q-values. The q-values may be added to the set $Q_n$ and may replace any existing q-values in $Q_n$. In particular, if there is already a q-value in $Q_n$ for a given token-sequence, then the q-value determined in block 42 for the given token-sequence may replace the previous q-value for the given token-sequence.

In block 43, the set $Q_n$ and the set $E_n$ may be input to an instance of the universal lexical analyzer 300 as the input probability parameters. Thus, the instance of the universal lexical analyzer 300 is configured for the given programming language. The set $E_n$ may have been generated prior to block 43, for example by executing the process of FIG. 3. For example, during a first iteration of the loop of blocks 41-46 the set $E_n$ may be generated at the same time that the set $Q_n$ is generated; however, during subsequent iterations of the loop of blocks 41-46, the set $E_n$ does not necessarily need to be updated.

In block 44, the instance of the universal lexical analyzer 300 is caused to analyze a test program, and an accuracy of the instance of the universal lexical analyzer 300 is determined. The test program is a program written in the given programming language for which the correct tokens are known. The accuracy of the instance of the universal lexical analyzer 300 may be determined, for example, by comparing the output of the analyzer 300 to the known correct tokens—for example, the accuracy may be represented numerically as the number of tokens in the output of the analyzer 300 that were correct divided by the total number of lexemes in the training program. In certain examples, the determining of the accuracy of the instance of the universal lexical analyzer 300 may be performed manually by a user of the instance of the universal lexical analyzer 300. In other examples, the determining of the accuracy of the instance of the universal lexical analyzer 300 may be performed automatically by processing circuitry executing the coefficient setting instructions 1020 described above. In certain examples, a record may be kept of a highest accuracy and the values of the coefficients that produced it, and the current accuracy may be stored in the record as the highest accuracy if the current accuracy is greater than the prior highest accuracy.

In block 45, it is determined whether a criterion or multiple criteria is/are satisfied. For example, it may be determined whether the accuracy satisfies a specified threshold criterion. In this context, a threshold criterion may include comparing the accuracy to a threshold value—such as 99%—and determining whether the accuracy is "equal to", "greater than", or "equal to or greater than" the threshold value. As another example, it may be determined whether the number of times the loop of blocks 41-46 has been performed has reached a specified threshold value. In certain examples, multiple criteria may be applied; in some such examples, satisfaction of one criterion may be sufficient to cause block 45 to be answered YES, while in other such examples more than one (perhaps all) of the criterion may need to be satisfied to cause block 45 to be answered YES. If block 45 is answered NO, then the process proceeds to block 46. If block 45 is answered YES, then the process proceeds to block 47.

In block 46, the values of the coefficients $\lambda_1, \ldots, \lambda_p$ are adjusted. In certain examples, the value of one coefficient is adjusted each time block 46 is reached, with the coefficient that is adjusted changing each time. In other examples, the values of multiple coefficients (perhaps all of the coefficients) may be adjusted each time block 46 is reached. In certain examples, the values may be adjusted by incrementing or decrementing the coefficients by specified amounts; in such examples, the increment/decrement amount may vary from one coefficient to the next. In certain examples, a step size of an increment/decrement may be based on the accuracy of the analyzer 300; for example, when the accuracy is very low the values may be incremented/decremented by large steps to quickly converge toward the best coefficient values, and then as the accuracy becomes closer to the threshold value the step sizes may become smaller so as to avoid overshooting or undershooting the best coefficient values. In certain examples, the values may be adjusted randomly. In certain examples, a series of preset value combinations may be tried, with a different preset value combination being tried each time block 46 is reached.

In block 47, the best values of the coefficients $\lambda_1, \ldots, \lambda_p$ are stored. In certain examples, the current value of the coefficients $\lambda_1, \ldots, \lambda_p$ may be presumed to be the best value, and hence the current values may be stored in block 47 without necessarily explicitly determining that they are the best values. For example, if block 47 is reached because the accuracy satisfied a threshold criterion, then the current values of the coefficients $\lambda_1, \ldots, \lambda_p$ may be presumed to be the best values. In certain examples, block 47 may include checking a record that indicates a highest accuracy and the values of the coefficients that produced it, and those values may be stored as the coefficients $\lambda_1, \ldots, \lambda_p$.

Figure 5:
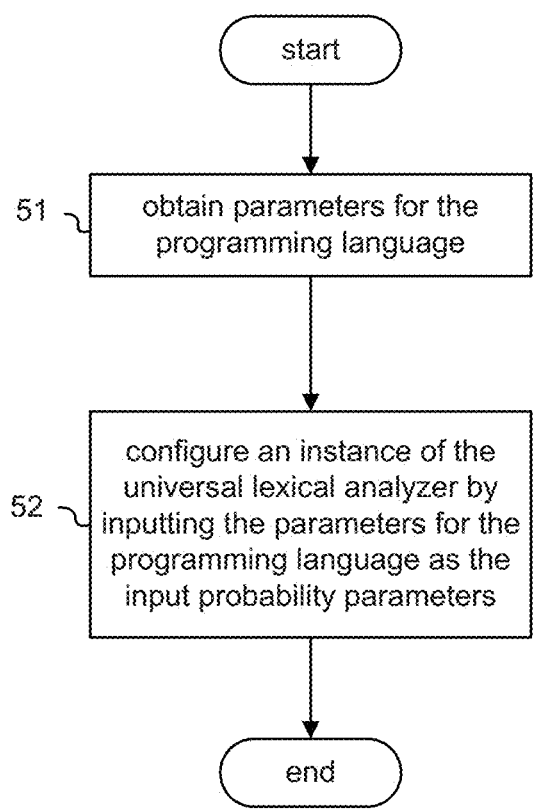
FIG. 5 illustrates an example method of configuring an instance of a universal lexical analyzer.

FIG. 5 illustrates a method of configuring an instance of a universal lexical analyzer, such as the universal lexical analyzer 300, for a given programming language. The entity that is performing the method of FIG. 5 may be referred to herein as the "actor", and the actor may be, for example, an entity that is to use the configured lexical analyzer for lexical analysis (hereinafter a "user"), or a party that creates the configured lexical analyzer for use by someone else (hereinafter a "provider").

In block 51, probability parameters for the given programing language are obtained. For example, obtaining the probability parameters may include using the analyzer trainer 100 and/or the method of FIG. 3 to generate the probability parameters. For example, a user or a provider may obtain the probability parameters by using an instance of the analyzer trainer 100 that is hosted on their own computing device(s). As another example, a user may obtain the probability parameters by remotely controlling an instance of the analyzer trainer 100 that is hosted on the computing device of a third-party. As another example, obtaining the probability parameters may include accessing previously generated probability parameters, whether those probability parameters were created by the actor or by someone else. For example, a user may remotely access a database (e.g., via the internet) that stores probability parameters that were generated by a third party, and may obtain the probability parameters from the database.

In block 52, an instance of a universal lexical analyzer, such as the universal lexical analyzer 300, may be configured for the given programming language by inputting the probability parameters to the instance of the analyzer as the input probability parameters. In certain examples, the instance of the universal lexical analyzer may be hosted on a computing device of the actor, and thus the actor may configure the instance of the universal lexical analyzer directly via the actor's computing device. In other examples, the instance of the universal lexical analyzer may be hosted on a computing device of a third party, and thus the actor may configure the analyzer remotely via a network. If no instance of the universal lexical analyzer exists prior to block 52, then block 52 may include causing an instance of universal lexical analyzer to be generated by causing processing circuitry (the actor's processing circuitry or a third-party's processing circuitry) to execute machine readable instructions, such as the lexical analyzer instructions 3000.

FIG. 6 illustrates another method of obtaining an instance of a universal lexical analyzer, such as the universal lexical analyzer 300, that is configured for a given programming language.

In block 61, an instance of a universal lexical analyzer, such as the universal lexical analyzer 300, is provided. The universal lexical analyzer may be configured to evaluate a function that depends on input probability parameters. Specifically, the function maps an input variable comprising a tuple of lexemes to an output variable comprising a tuple of tokens based on input probability parameters. For example, the function may be given by equation 8. Providing an instance of the universal lexical analyzer may include causing processing circuitry to execute machine readable instructions, such as the lexical analyzer instructions 3000.

In block 62, training programs that are in the given programming language may be fed to an analyzer trainer, such as the analyzer trainer 100. The training programs may each comprise a tuple of lexemes and associated tokens. For example, the tuple of lexemes for a training program may be obtained by a user from a sample program written in the given programming language, and the token that is associated with each of the lexemes may be specified by the user based on the user's own judgment. In certain examples, each of the training programs may be input to the analyzer trainer a tuple of lexemes and a corresponding tuple of tokens. In other examples, the training programs may be input to the analyzer trainer a tuple of lexeme-token pairs.

In block 63, the analyzer trainer is caused to determine a set of probability parameters for the given programming language, based on the lexemes and tokens in the training programs. In certain examples, the probability parameters may include: q-values, each of which is a probability corresponding to a token-sequence from one of the training programs, and e-values, each of which is a probability corresponding to a lexeme-token pair from one of the training programs.

In certain examples, block 63 may include causing the analyzer trainer to: identify token-sequences and lexeme-token pairs in the training programs; for each of the identified token-sequences, determine a q-value for the respective token-sequence by evaluating a first probability function; and for each of the identified lexeme-token pairs, determine an e-value for the respective lexeme-token pair by evaluating a second probability function. In such examples, the first probability function may map an input token-sequence to a probability of a token of the input token-sequence in view of preceding tokens in the input token-sequence, and the second probability function may map an input lexeme-token pair to a probability of the lexeme of the input lexeme-token pair in view of the token of the input lexeme-token pair. For example, the first probability function may be given by equation 2 and the second probability function may be given by equation 4. In certain such examples, block 63 may include tuning coefficients of the first probability function by repeatedly testing an accuracy of the lexical analyzer and adjusting the coefficients if a threshold level of accuracy for the lexical analyzer has not been achieved.

In certain examples, the analyzer trainer is caused to determine a set of probability parameters in block 63 without providing regular expressions of the given programming language to the analyzer trainer. Specifically, in certain examples, the instance of the lexical analyzer is configured for the given programming language is done without providing regular expressions of the given programming language to the analyzer trainer.

In block 64, the instance of the lexical analyzer is configured for the given programming language by inputting the probability parameters from block 63 as the input probability parameters of the function of the lexical analyzer. For example, if the function is given by equation 8, then a set $Q_n$ and a set $E_n$ may be input to the lexical analyzer, and the probability parameters $q_k$ and $e_p$ in equation 8 may be obtained from $Q_n$ and $E_n$, respectively, where n indicates the given programming language. In certain examples, the configuring of the universal lexical analyzer for the given programming language is done without providing regular expressions of the given programing language to universal lexical analyzer.

[Example Computing Devices]

FIG. 7 illustrates a first computing device 701 comprising processing circuitry 702 and non-transitory machine readable media 703, which stores a copy of the training instructions 1000 and a copy of the lexical analyzer instructions 3000. The processing circuitry 702 may form the analyzer trainer 100 by executing the training instructions 1000, and may form the universal lexical analyzer 300 by executing the lexical analyzer instructions 3000.

FIG. 8 illustrates a second computing device 801 and a third computing device 901. The second computing device 801 comprises processing circuitry 802 and non-transitory machine readable media 803, which stores a copy of the training instructions 1000. The third computing device 901 comprises processing circuitry 902 and non-transitory machine readable media 903, which stores a copy of the lexical analyzer instructions 3000. The processing circuitry 802 may form the analyzer trainer 100 by executing the training instructions 1000, while the processing circuitry 902 may form the universal lexical analyzer 300 by executing the lexical analyzer instructions 3000. The computing device 801 and the computing device 901 may be communicably connected via a network 850 (such as the internet), and probability parameters determined by an analyzer trainer 100 instantiated by the computing device 801 may be communicated to the computing device 901, enabling an instance of the universal lexical analyzer 300 on the computing device 901 to be configured using the probability parameters.

The processing circuitry 702, 802, and 902 may each include any combination of hardware, which may or may not be virtualized, that is capable of executing machine readable instructions, such as processors (e.g., CPUs), microprocessors, etc. The non-transitory machine readable media 703, 803, and 804 may include non-volatile storage media such as a solid-state storage (e.g., solid-state drives, USB flash drives, flash storage cards (e.g., secured digital (SD) cards, etc.)) a hard disk drive, an optical disk (e.g., CD, DVD, BlueRay, etc.), a magnetic disk (e.g., floppy disk), etc., or may include volatile storage media, such as dynamic random access memory (DRAM), static random access memory, (SRAM), etc.

The analyzer trainer 100, the storage media 200, and the universal lexical analyzer 300 may be, but do not necessarily have to be, part of the same computing device. In addition, the computing device(s) that host(s) the analyzer trainer 100, the storage media 200, and/or the universal lexical analyzer 300 do not necessarily all have to be controlled by the user of the analyzer trainer 100, the storage media 200, and/or the universal lexical analyzer 300.

For example, the analyzer trainer 100, the storage media 200, and the universal lexical analyzer 300 may be hosted on the user's computing device(s), such as the computing device 701 (see FIG. 7), and the user may control the analyzer trainer 100 and the universal lexical analyzer 300 directly via their computing device.

As another example, the analyzer trainer 100, the storage media 200, and the universal lexical analyzer 300 may all be hosted on a third-party's computing device(s), such as the computing device 701 (see FIG. 7). In such an example, the user may access the analyzer trainer 100 and the universal lexical analyzer 300 remotely (e.g., via a network such as the internet) and may control them via commands issued over the network. For example, the analyzer trainer 100 and the storage media 200 may be made available for the use through a web-interface.

As another example, the analyzer trainer 100 may be hosted on a third-party's computing device(s), such as the computing device 801 (see FIG. 8), while the storage media 200 and the universal lexical analyzer 300 may be hosted on the user's computing device(s), such as the computing device 901 (see FIG. 8). For example, the user may access the analyzer trainer 100 remotely (e.g., via a network such as the internet) and may control it via commands issued over the network. For example, the user may supply training programs to the analyzer trainer 100 over the network and remotely cause the analyzer trainer 100 to generate a set of probability parameters from the training programs. The set of probability parameters generated the analyzer trainer 100 may be communicated from the host's computing device back to the user's computing device via the network whereupon they may be stored in the storage media 200 and/or used to configure the lexical analyzer 100. In certain examples, the user may also obtain a copy of the lexical analyzer instructions 3000, from which the user generates the lexical analyzer 300, from the third-party's computing device(s) via the network; in some such examples, the set of probability parameters generated by the analyzer trainer 100 may be included within the lexical analyzer instructions 3000.

As another example, the analyzer trainer 100 and the storage media 200 may be hosted on a third-party's computing device(s), such as the computing device 801 (see FIG. 8), while the universal lexical analyzer 300 may be hosted on the user's computing device(s), such as the computing device 901 (see FIG. 8). Furthermore, in this example implementation the third party may supply training programs to the analyzer trainer 100, cause the analyzer trainer 100 to generate a set of probability parameters based on the training programs, and store the set of probability parameters in the storage media 200. The user may then access the storage media 200 remotely to download a copy of the set of probability parameters via the network, and may then configure the analyzer trainer 100 using the probability parameters.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of first data bits, wherein the first data bits . . . " could encompass both one first data bit and multiple first data bits, notwithstanding the use of the pluralized form.

The use of "a number" in the manner described above should not be interpreted to mean that items that are referred to without the phrase "a number" are necessarily singular. In particular, when items are referred to using the articles "a", "an", and "the", this should be understood to mean that there is "at least one" of the item, unless explicitly stated otherwise. When these articles are used in this way, the word describing the item(s) may be written in singular form for grammatical consistency, but this does not necessarily mean that only one items is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. While the above disclosure has been shown and described with reference to the foregoing examples, it should be understood that other forms, details, and implementations may be made without departing from the spirit and scope of this disclosure.

What is claimed is:

1. A non-transitory machine readable medium storing machine readable instructions comprising:
lexical analyzer instructions that, when executed, form a universal lexical analyzer that is to lexically analyze an input program by evaluating a function that maps an input variable comprising a tuple of lexemes to an output variable comprising a tuple of tokens based on input probability parameters, wherein the universal lexical analyzer is configurable for any programming language by inputting a set of probability parameters for the respective programming language as the input probability parameters of the function; and
training instructions that are to generate a set of probability parameters configured to identify tokens for any programming language by:
receiving training programs that are in the respective programming language, each comprising a tuple of lexemes with associated tokens, wherein the tuple identifies an associated one of the tokens for each of the lexemes, and
determining the set of probability parameters for the respective programming language based on the identified token for each of the lexemes in the tuple in each of the training programs that are in the respective programming language,
wherein the probability parameters include:
q-values, each of which is a probability corresponding to a last token of a token-sequence in view of preceding tokens in the token-sequence; and
e-values, each of which corresponds to a probability for each lexeme in view of an identified token.

2. The non-transitory machine readable medium of claim 1, wherein the training instructions are to determine a set of probability parameters for a given programming language without reliance on knowledge of regular expressions of the given programing language.

3. The non-transitory machine readable medium of claim 1,
wherein the universal lexical analyzer is configurable for a given programming language without inputting regular expressions of the given programing language to the universal lexical analyzer.

4. The non-transitory machine readable medium of claim 1,
wherein the training instructions are to:
identify token-sequences and lexeme-token pairs in the training programs,
for each of the identified token-sequences, determine a q-value for the respective token-sequence by evaluating a first probability function, and
for each of the identified lexeme-token pairs, determine an e-value for the respective lexeme-token pair by evaluating a second probability function,
where the first probability function maps an input token-sequence to a probability of a token of the input token-sequence in view of preceding tokens in the input token-sequence, and
the second probability function maps an input lexeme-token pair to a probability of the lexeme of the input lexeme-token pair in view of the token of the input lexeme-token pair.

5. The non-transitory machine readable medium of claim 4,
wherein the training instructions are to tune coefficients of the first probability function by repeatedly testing an accuracy of an instance of the lexical analyzer and adjusting the coefficients if a threshold level of accuracy has not been achieved.

6. The non-transitory machine readable medium of claim 1, the machine readable instructions further comprising:
parameter setting instructions that are to configure an instance of the universal lexical analyzer for a given programming language by inputting a set of probability parameters for the given programming language as the input probability parameters.

7. A method of configuring a universal lexical analyzer that is to evaluate a function that maps an input variable comprising a tuple of lexemes to an output variable comprising a tuple of tokens based on input probability parameters, the method comprising:
obtaining a first set of probability parameters configured to identify tokens for a first programming language by:
feeding training programs that are in the first programming language to an analyzer trainer comprising processing circuitry executing training instructions, the training programs each comprising a tuple of lexemes with associated tokens, wherein the tuple identifies an associated one of the tokens for each of the lexemes, and
causing the analyzer trainer to determine the first set of probability parameters based on the identified token for each of the lexemes in the tuple in each of the training programs;
configuring the universal lexical analyzer for the first programming language by inputting the first set of probability parameters to the function as the input probability parameters, wherein the first set of probability parameters include:
q-values, each of which is a probability corresponding to a last token of a token-sequence in view of preceding tokens in the token-sequence; and
e-values, each of which corresponds to a probability for each lexeme in view of the identified token.

8. The method of claim 7,
wherein the configuring of the lexical analyzer for the first programming language is done without providing regular expressions of the first programing language to the analyzer trainer.

9. The method of claim 7,
wherein the configuring of the universal lexical analyzer for the first programming language is done without providing regular expressions of the first programing language to universal lexical analyzer.

10. The method of claim 7, further comprising:
causing the analyzer trainer to:
identify token-sequences and lexeme-token pairs in the training programs,
for each of the identified token-sequences, determine a q-value for the respective token-sequence by evaluating a first probability function, and
for each of the identified lexeme-token pairs, determine an e-value for the respective lexeme-token pair by evaluating a second probability function,
where the first probability function maps an input token-sequence to a probability of a token of the input token-sequence in view of preceding tokens in the input token-sequence, and
the second probability function maps an input lexeme-token pair to a probability of the lexeme of the input lexeme-token pair in view of the token of the input lexeme-token pair.

11. The method of claim 10, further comprising:
tuning coefficients of the first probability function by repeatedly testing an accuracy of the lexical analyzer and adjusting the coefficients if a threshold level of accuracy for the lexical analyzer has not been achieved.

12. The method of claim 7,
wherein the analyzer trainer is hosted remotely on a third-party's computing device and the obtaining the first set of probability parameters for the first programming language includes transmitting the training programs to the analyzer trainer over a network and receiving the first set of probability parameters from the analyzer trainer via the network.

13. A non-transitory machine readable medium storing machine readable instructions comprising:
lexical analyzer instructions that, when executed form a universal lexical analyzer that is to lexically analyze an input program by evaluating a function that maps an input variable comprising a tuple of lexemes to an output variable comprising a tuple of tokens based on input probability parameters,
training instructions that are to generate a set of q-values and a set of e-values configured to identify a programming language by:
receiving training programs that are in a respective programming language, each comprising a tuple of lexemes with associated tokens, wherein the tuple identifies an associated one of the tokens for each of the lexemes,
generating q-values for the respective programing language by, for each token-sequence in the training programs, determining a probability corresponding to a last token of the token-sequence in view of preceding tokens in the token-sequence; and
generating e-values for the respective programing language by, for each lexeme-token pair in the training programs, determining a probability corresponding to a probability for each of the lexemes in view of the identified token,
parameter setting instructions that are to configure an instance of the universal lexical analyzer for a given programing language by inputting a set of q-values and a set of e-values that were generated by the training instructions for the given programing language to the instance of the universal lexical analyzer as the input probability parameters.

14. The non-transitory machine readable medium of claim 13,
wherein the training instructions are to determine the set of q-values and the set of e-values for the given programming language without reliance on knowledge of regular expressions of the given programming language.

15. The non-transitory machine readable medium of claim 13,
wherein the parameter setting instructions are to configure the instance of the universal lexical analysis engine without inputting regular expressions of the given programing language to the universal lexical analyzer.

16. The non-transitory machine readable medium of claim 14,
wherein the training instructions are to tune coefficients of a probability function that is used to determine the set of q-values by repeatedly testing an accuracy of an instance of the universal lexical analyzer and adjusting the coefficients if a threshold level of accuracy for the instance of the universal lexical analyzer has not been achieved.

17. The non-transitory machine readable medium of claim 13,
wherein the parameter setting instructions include instructions to, in response to a user requesting a lexical analyzer in a selected programming language,
configure an instance of the universal lexical analyzer for the selected programming language if a set of q-value and a set of e-values for the selected programing language are available, and
call the training instructions if a set of q-value and a set of e-values for the selected programing language are not available.

* * * * *